United States Patent [19]
Huang

[11] Patent Number: 5,582,112
[45] Date of Patent: Dec. 10, 1996

[54] TURNTABLE STRUCTURE

[76] Inventor: Li-Sui Huang, No. 23, Yu Ai Rd., Chia-Yee City, Taiwan

[21] Appl. No.: 494,800

[22] Filed: Jun. 26, 1995

[51] Int. Cl.$^6$ ..................................................... A47B 11/00
[52] U.S. Cl. .............................. 108/22; 108/20; 476/64; 74/625
[58] Field of Search .................................. 108/20, 21, 22, 108/103, 104, 139; 248/522; 476/64; 74/625

[56] References Cited

U.S. PATENT DOCUMENTS

| | | | |
|---|---|---|---|
| 2,875,623 | 3/1959 | Babler | 476/64 X |
| 2,902,741 | 9/1959 | Hankin, Jr. | 108/22 X |
| 4,028,041 | 6/1977 | Zambrano, Jr. | 476/64 X |
| 4,555,990 | 12/1985 | Egawa | 108/20 |
| 5,152,099 | 10/1992 | Nilssen | 108/21 X |

FOREIGN PATENT DOCUMENTS

| | | | |
|---|---|---|---|
| 932220 | 7/1963 | United Kingdom | 108/22 |
| 2235426 | 3/1991 | United Kingdom | 108/22 |

*Primary Examiner*—Peter M. Cuomo
*Assistant Examiner*—Janet M. Wilkens
*Attorney, Agent, or Firm*—Morton J. Rosenberg; David I. Klein

[57] ABSTRACT

There is provided an improved turntable structure wherein a turning plate may be motor-driven or manually driven at the option of a user. The turntable includes a turning plate supported on a base plate via a rotation ring assembly. On the bottom surface of the turning plate is mounted a driving device from which extends a tie rod by which the user may manipulate the position of a driving wheel in the motor of the driving device to engage or disengage from the rotation ring assembly. The rotation ring assembly includes an upper sleeve affixed to the bottom surface of the turning plate, a lower sleeve affixed to the top surface of the base plate, and a bushing circumferentially opposing both the upper and lower sleeves. A plurality of roller balls are captured in aligned grooves formed into opposing surfaces of each of the upper and lower sleeves and the bushing. During motor-driven operation, the motor's driving wheel is brought to bear against the interior surface of the ring-shaped bushing, whereby the turning plate and the upper sleeve fastened thereto rotate relative to the bushing, following the travel of the driving wheel along that bushing. When the user halts the turning table's motion by grasping it, the driving wheel continues to travel along the interior surface of the bushing; however, the bushing then rotates relative to the stationary upper sleeve. Upon the user's release of the turning plate, rotation of the turning plate resumes as before.

4 Claims, 5 Drawing Sheets

TURNTABLE STRUCTURE

BACKGROUND OF THE INVENTION

1. Field of the Invention

The present invention relates to a turntable structure, and more particularly to a motor-driven turntable for use in the support and display of goods wherein the turning plate may be rotated automatically or manually; and, wherein automatic rotation may be manually impeded without detrimental effect on the driving motor, even if such driving motor remains operating during the period of impediment.

2. Description of the Related Art

Turntable assemblies are used in the prior art to display goods (like glasses, watches, etc.) in show windows or to displaceably support dishes on a table during meals. Prior art motor-driven turntables are invariably driven to rotate continuously. Often, however, such continuous rotation presents significant obstacles to convenient utilization. When it becomes necessary, for instance, to remove or replace the goods or dishes on the turning plate, the user must do so awkwardly while the turning plate is in motion, or else either manually restrain the power-driven motion during the removal/replacement or power down the motor altogether. None of these options is particularly desirable with prior art turntables. Temporarily restraining the turning plate, which many users are apt to do, disturbs the often intricately coupled parts of a typical drive assembly. Moreover, stopping the turning plate while the motor remains engaged thereto causes the generation of a substantial frictional force between the motor and the turning plate. If the magnitude of that frictional force attains a sufficient level, damage to the motor and various interacting parts of the drive assembly eventually occur. At best, wear and tear on the motor and those parts is accelerated, and the service life of the turntable is shortened.

Cutting off the power source of the motor each time a good or dish on the turn plate is to be removed or replaced is typically quite inconvenient and burdensome. Nevertheless, doing so still does not remove the inconveniences arising from the fact that the stopped turning plate remains engaged to the stopped drive wheel of the motor. Thus, the user cannot manually rotate the turning plate to facilitate his or her removal/replacement task.

SUMMARY OF THE INVENTION

It is an object of this invention to provide an improved turntable wherein a motor drives the turning plate's rotation, and wherein the turning plate's rotation may be halted without damaging the motor.

It is another object of this invention to provide a turntable wherein a turning plate's rotation may be effected manually or automatically, the motor drive wheel being disengaged from a turning plate such that it is allowed to rotate freely when the turntable is switched to its manual drive mode.

It is another object of this invention to provide a turntable having a prolonged surface life.

It is yet another object of the present invention to provide a turntable in which every part of a rotation drive assembly may be operated to rotate the turning plate continuously when unimpeded by a user.

DESCRIPTION OF THE PREFERRED EMBODIMENT

Figure 1:
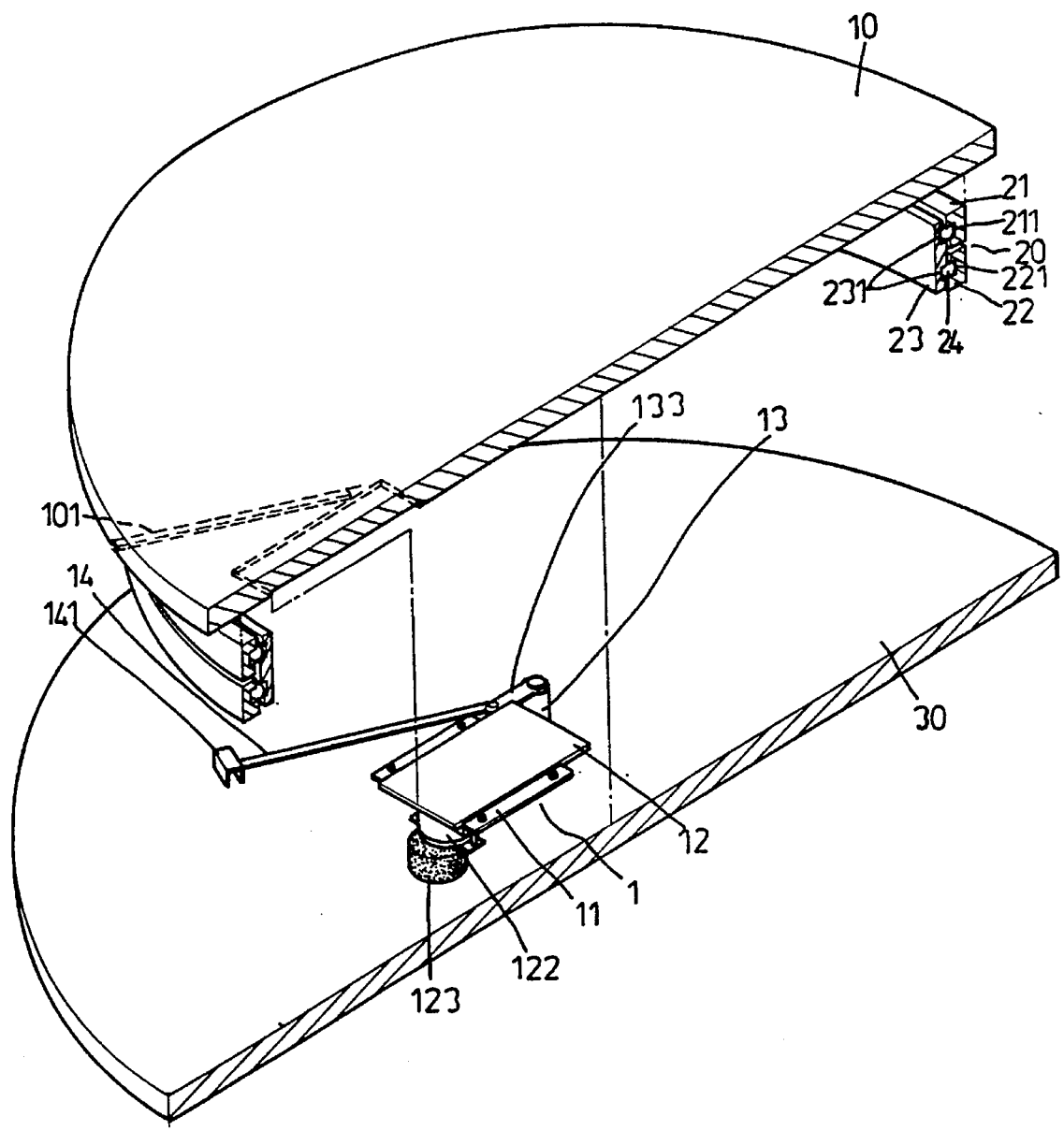
FIG. 1 is an exploded perspective view, partially cut-away, of a preferred embodiment of the present invention.
Figure 2:
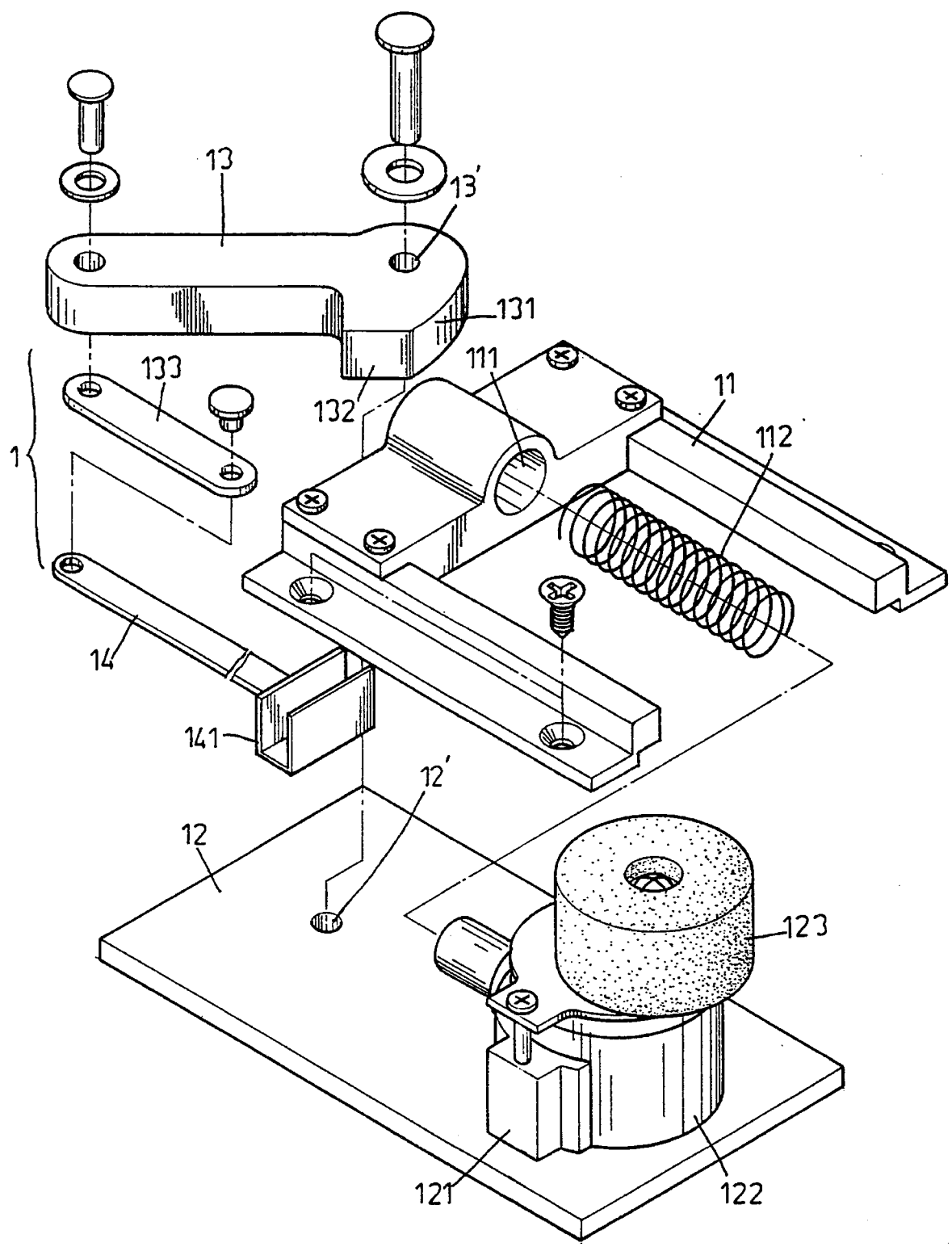
FIG. 2 is an exploded perspective view of a part of a preferred embodiment of the present invention.

Referring now to FIGS. 1–2, there is shown a preferred embodiment of the turntable of the present invention. The turntable generally includes a turning plate 10, a rotation ring assembly 20, and a base plate 30. Turning plate 10 is a face plate having mounted to its bottom surface near the periphery a driving device 1. The driving device 1 includes a U-shaped fixed frame 11 which is affixed to turning plate 10 by screws or other suitable fasteners. The fixed frame 11 has formed therein a spring retainer 111 which receives a spring 112.

A slide carriage 12 and a cam set stick 13 pivotally coupled to a tie rod 14 is pivotally coupled to the slide carriage 12. A first end of slide carriage 12 inserts into a guideway formed by the fixed frame 11. A second end, which is disposed closer to the turning plate 10, has fastened thereto a motor holder 121 on which is mounted a motor assembly 122 having a driving wheel 123. The motor holder 121 includes a projecting shaft portion which matingly engages the free end of the spring 112 received in retainer 111 of the fixed frame 11.

At the first end of slide carriage 12 which extends past the fixed frame 11 is pivotally mounted cam set stick 13. Stick 13 is mounted by inserting a pivot member through a pivot opening 13' in stick 13 and securing that pivot member to the slide carriage 12 at coupling point 12'. Stick 13 is formed with two retaining points 131, 132, the radial distance of retaining point 132 from the pivot opening 13' being greater than the radial distance of retaining point 131 therefrom. The opposing end of set stick 13 is pivotally coupled to a tie rod 14 via a pitman 133, the tie rod 14 being received in a groove 101 formed in the bottom surface of turning plate 10 and extending beyond the rim of turning plate 10. Tie rod 14 terminates in a fixed handle 141 such that a user may manipulate the handle to push or pull the tie rod 14 along its length and thereby pivotally displace set stick 13 about its pivot at opening 13'.

Rotation ring assembly 20 includes upper and lower sleeves 21, 22, and a bushing 23. Upper and lower sleeves 21, 22 have respectively formed in sides thereof opposing bushing 23, grooves 211, 221. These grooves 211, 221 align with two grooves 231 formed in the bushing 23. Between the aligned grooves of the sleeves 21, 22 and bushing 23 are captured a plurality of roller balls 24. Ring assembly 20 is assembled such that the spacing between the upper and lower sleeves 21, 22 remains substantially constant around their peripheries, and portions of the upper and lower sleeves 21, 22 extend, respectively, beyond the upper and lower extents of the bushing 23.

Base plate 30 is a flat plate which supports turning plate 10 and rotation ring assembly 20. On its top surface is securely fastened lower sleeve 22 of the rotation ring assembly 20.

Figure 3A:
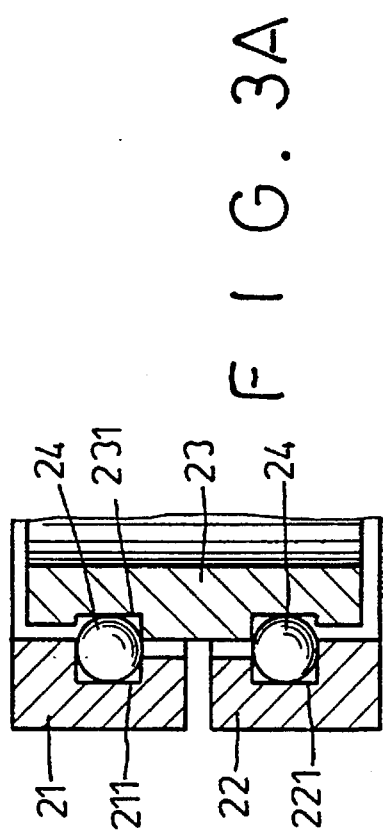
FIG. 3A is an enlarged view of that portion of FIG. 3 marked 3A.
Figure 3:
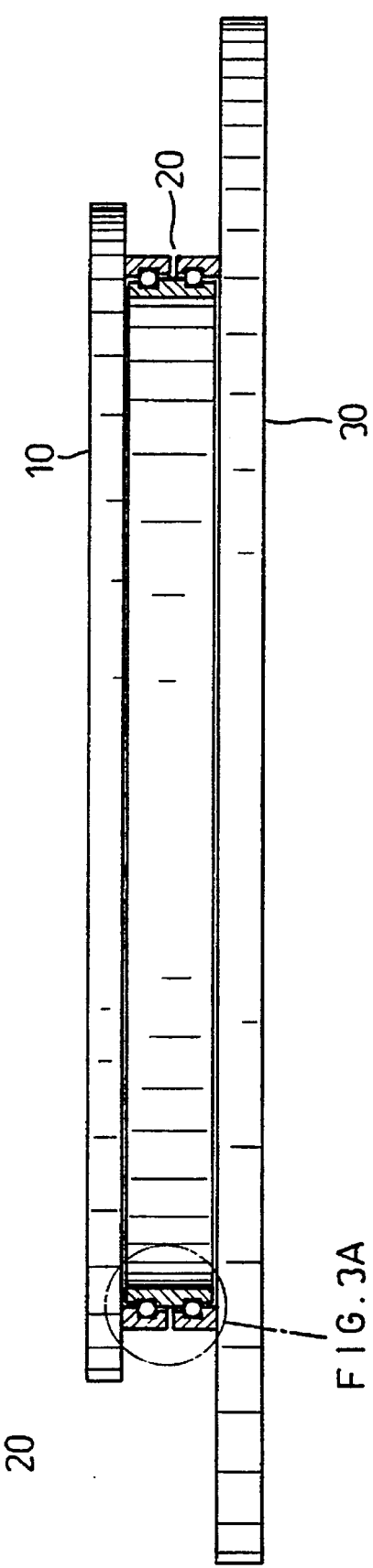
FIG. 3 is an elevational view, partially cut-away, of a preferred embodiment of the present invention.

Referring now to FIGS. 3–3A, the assembled turntable includes the fixed frame 11 of the driving device 1 fastened to the bottom surface of the turning plate 10, the tie rod 14 of the driving device 1 extending through the groove 101 on the bottom surface of the turning plate 10 beyond the rim thereof, the upper sleeve 21 of the rotation ring assembly 20 securely fastened to the bottom surface of the turning plate 10, and the lower sleeve 22 securely fastened to the top surface of the base plate 30. A space is then retained between top and bottom extents of the bushing 23 and the bottom surface of the turning plate 10 and the top surface of the base plate 30.

Figure 4:
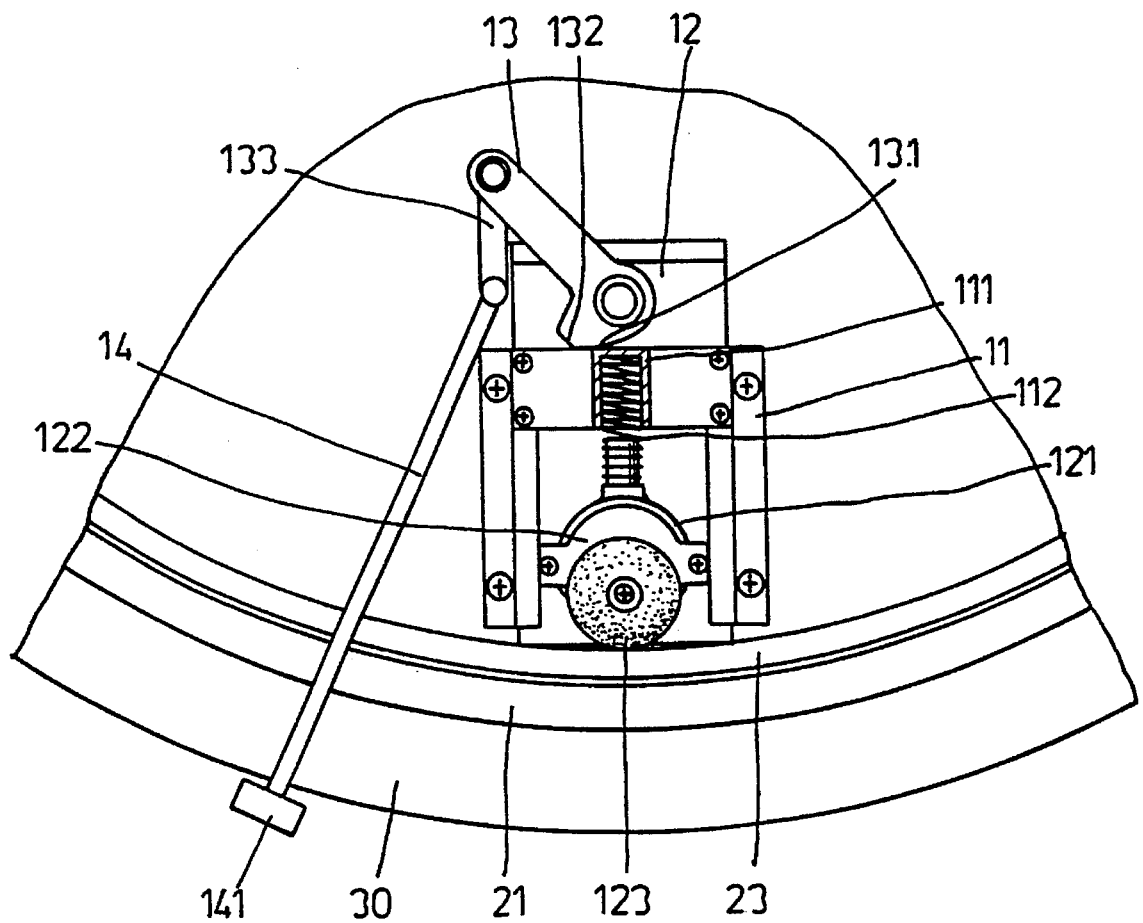
FIG. 4 is an elevational view, partially cut-away, of a part of a preferred embodiment of the present invention in a motor-driven state; and, FIG. 5 is an elevational view, partially cut-away, of a part of a preferred embodiment of the present invention in a manually-driven state.

Referring now to FIG. 4, automatic rotation of the turning plate 10 is effected by manipulating the handle 141 of tie rod 14 to cause the set stick 13 to pivot such that the retaining point 131 bears against the fixed frame 11. As stick 13 is mounted to sliding carriage 12, this pushes, aided by the spring 112 set in the fixed frame 11, the slide carriage 12 and the motor holder 121, urging the driving wheel 123 of the motor 122 against the interior surface of the bushing 23. Thus, when the motor 122 is actuated, the driving wheel 123 is driven along the bushing 23. Absent any intervening force, the upper sleeve 21 and the turning plate 10 follow the driving wheel 123 to rotate relative to the bushing 23 and the base plate 30.

While turning plate 10 is being driven by the motor 122 and driving wheel 123, a user may halt the turning plate 10 to take goods or dishes therefrom simply by grasping it, holding the upper sleeve 21 on the turning plate 10 stationary. The driving wheel 123 of the motor 122 will continue to drive the bushing 23; however, bushing 23 will then rotate relative to the upper sleeve 21 via the rolling of the balls 24. Upon finishing the task of taking goods or dishes from the turning plate 10, the user may release his or her grip, and the rotation of plate 10 will be restored.

Figure 5:
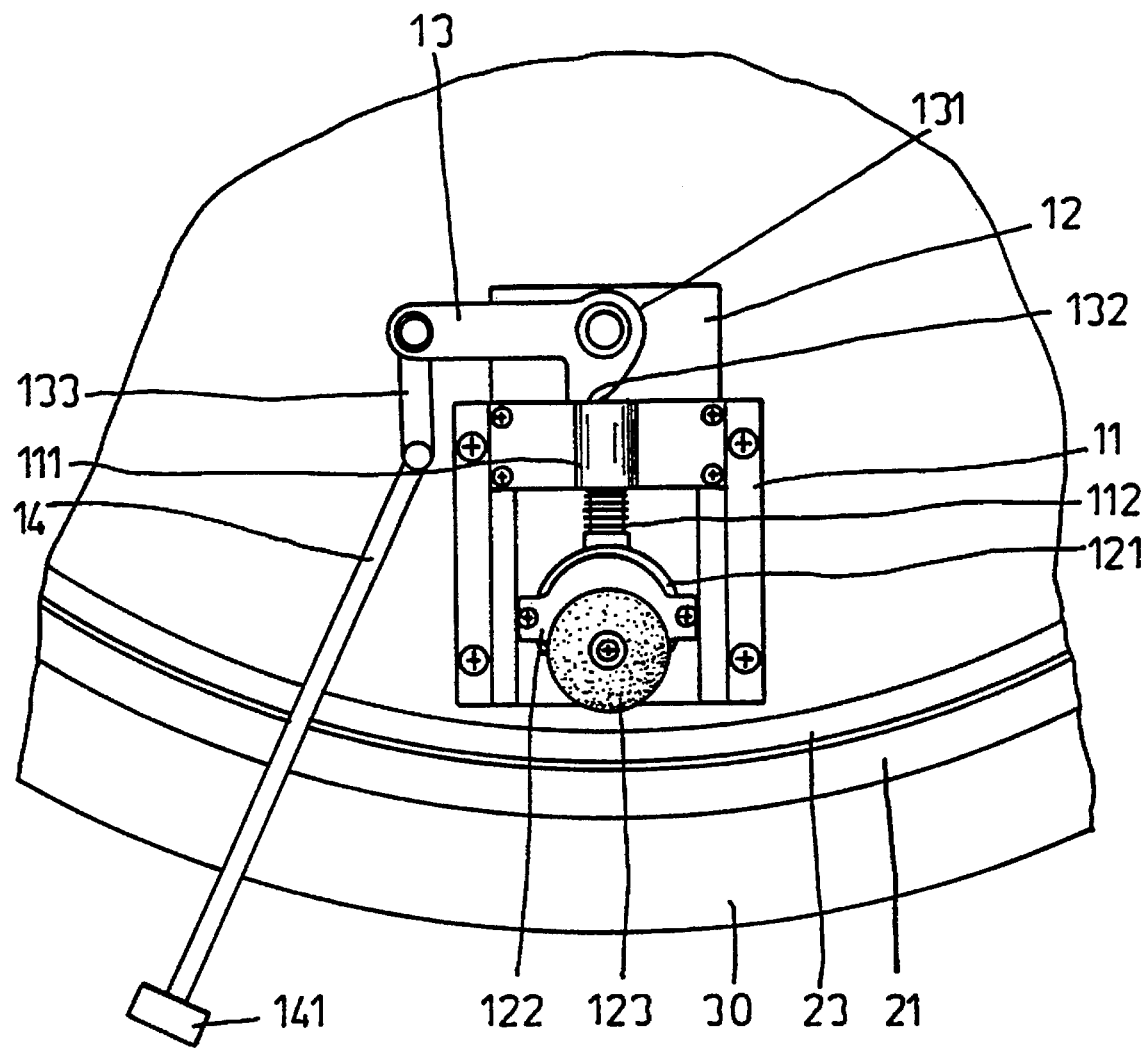

Another main feature of the present invention is to provide the capability of switching between manual and automatic drive modes. Referring to FIG. 5, a user need only pull the handle 141 of the tie rod 14, causing the tie rod 14 to draw the pitman 133 in such manner that it pivots the set stick 13, causing the retaining point 132 to press against the fixed frame 11. The set stick 13 thus pulls the slide carriage 12 toward the center of the turning plate 10. This withdraws the motor 122 and its driving wheel 123 from engagement with the interior surface of the bushing 23, freeing the turning plate 10 for manual rotation. The spring 112 is thereby compressed back into the spring retainer 111 by the motor holder 121. To resume automatic drive operation, a user simply returns the handle 141 of the tie rod 14, causing the retaining point 131 of set stick 13 to again contact the fixed frame 11 with the expansion force of the spring 112 biasing the driving wheel 123 against the bushing 23, as shown in FIG. 4.

I claim:

1. An automatically rotatable turntable system comprising:

(a) a base plate having a substantially planar upper surface;

(b) a substantially planar turning plate operably supported on said base plate to be rotatable about an axis, said turning plate being defined peripherally by a rim portion and having a top surface and a bottom surface on opposing sides thereof, said bottom surface having formed therein an elongate groove extending from said rim portion;

(c) a rotation ring assembly coupled between said bottom surface of said turning plate and said upper surface of said base plate, said rotation ring assembly including an upper sleeve coaxially coupled to said bottom surface of said turning plate and a lower sleeve coaxially coupled to said upper surface of said base plate, each of said upper and lower sleeves having a substantially cylindrical annular inner wall having a groove concentrically formed therein, said rotation ring assembly including a bushing disposed coaxially within said annular inner walls of said upper and lower sleeves, said bushing having a pair of grooves circumferentially formed therein, said grooves of said bushing being substantially aligned respectively with said grooves formed in said inner walls of said upper and lower sleeves, said rotation ring assembly including friction mitigating means captured within said aligned grooves of said bushing and said upper and lower sleeves, said bushing being thereby displaceable relative to said inner walls of said upper and lower sleeves; and, (d) driving means coupled to said bottom surface of said turning plate for automatically actuating rotation of said turning plate by frictionally engaging said bushing of said rotation ring assembly, said driving means having an elongate tie rod extending therefrom for reversibly actuating said frictional engagement of said driving means with said bushing, said tie rod being received in said groove formed in said bottom surface of said turning plate and adapted for manipulation by a user.

2. The automatically rotatable turntable system as recited in claim 1 wherein said driving means includes:

(a) a fixed frame member fixedly coupled to said bottom surface of said turning plate;

(b) a slide carriage slidably coupled to said fixed frame member, said slide carriage being spring biased from said fixed frame member toward said rim portion of said turning plate;

(c) a set stick pivotally coupled to said slide carriage at a coupling point and having a cam portion contacting said fixed frame member, said set stick being pivotally displaceable substantially about said coupling point to reversibly displace said slide carriage between a first carriage position and a second carriage position, said slide carriage being disposed closer to said rim portion of said turning plate in said first carriage position thereof; and, (d) a motor mounted on said slide carriage having a driving wheel for frictionally engaging said bushing of said rotation ring assembly when said slide carriage is disposed in said first carriage position.

3. The automatically rotatable turntable system as recited in claim 1 wherein said upper sleeve is disposed coaxially in fixed spaced relation to said lower sleeve, and said bushing is disposed in fixed spaced relation to said bottom surface of said turning plate and to said upper surface of said base plate.

4. The automatically rotatable turntable system as recited in claim 1 wherein said driving means includes a set stick pivotally coupled thereto, said set stick being pivotally displaceable between a first cam position and a second cam position responsive to said manipulation of said tie rod, said driving means being in contact with said bushing when said set stick is disposed in said first cam position and being spaced from said bushing when said set stick is disposed in said second cam position.

* * * * *